(12) United States Patent
Johari et al.

(10) Patent No.: US 12,260,463 B2
(45) Date of Patent: Mar. 25, 2025

(54) DASHBOARD INTERFACE DATA RECONCILIATION AND TASK PROCESSING

(71) Applicant: ADP, Inc., Roseland, NJ (US)

(72) Inventors: Nishit Johari, Tempe, AZ (US); Yuhong Lampner, Tempe, AZ (US)

(73) Assignee: ADP, Inc., Roseland, NJ (US)

( * ) Notice: Subject to any disclaimer, the term of this patent is extended or adjusted under 35 U.S.C. 154(b) by 185 days.

(21) Appl. No.: 17/659,590

(22) Filed: Apr. 18, 2022

(65) Prior Publication Data
US 2023/0334592 A1 Oct. 19, 2023

(51) Int. Cl.
*G06Q 40/12* (2023.01)
*G06F 3/0482* (2013.01)
*G06F 3/0483* (2013.01)
*G06F 3/04847* (2022.01)
*G06F 16/26* (2019.01)

(52) U.S. Cl.
CPC ......... *G06Q 40/123* (2013.12); *G06F 3/0482* (2013.01); *G06F 3/0483* (2013.01); *G06F 3/04847* (2013.01); *G06F 16/26* (2019.01); *G06Q 40/125* (2013.12)

(58) Field of Classification Search
CPC .... G06Q 40/123; G06Q 40/125; G06F 16/26; G06F 3/0482; G06F 3/0483; G06F 3/0487

USPC .......................................................... 705/31
See application file for complete search history.

(56) References Cited

U.S. PATENT DOCUMENTS

| | | | | |
|---|---|---|---|---|
| D841,041 S | * | 2/2019 | Ng | D14/486 |
| D848,468 S | * | 5/2019 | Ng | D14/486 |
| 10,628,436 B2 | * | 4/2020 | Berger | G06F 16/2455 |
| 11,610,670 B1 | * | 3/2023 | Chen | G16H 40/20 |
| 2018/0218051 A1 | * | 8/2018 | Berger | G06F 16/951 |

* cited by examiner

*Primary Examiner* — Hai Tran
(74) *Attorney, Agent, or Firm* — Foley & Lardner LLP

(57) ABSTRACT

A method, apparatus, system, and computer program code for data reconciliation and task processing implemented in a dashboard interface. A dashboard interface is displayed having a number of tabs that correspond to categorical processing steps for the task, vertically arranged along an edge of the dashboard. The number of tabs include at least an overview tab, a configuration tab, a reconciliation tab, and a transaction tab. A number of selectable parameters are retrieved selected from the configuration tab. Data is aggregated and processed across multiple database tables according to the selected parameters. The aggregated data is displayed on the dashboard interface as a series of cards arranged horizontally according to a logical sequence of user interactions. At least one card includes a visualization of the aggregated data that is displayed in a progressive format that enables a user to drill-down into data details of a selected segment of the visualization.

18 Claims, 14 Drawing Sheets

MasterTax USA Payroll Tax Workspace

Wed Aug 18 2021 14:56:53 GMT-0700 (Mountain Standard Time)

JSMITH
Service Provider - MTQ11 (ID# 11645)

Quarter: 2021 Q2

| System Settings | Jurisdictions | Companies |

Dashboard

Prepare

Interim

Reconcile

File/Pay

Tax Masters As of now

Click the text label to view and edit details:

- 4 Batch Payment
- 3 Fraction Handling
- 6 Overpay Option Override
- 6 Local Rate

Tax Forms As of now

DISPLAY ALL FORMS

Click the text label to view and edit details:

- 16 Paper but Hand Key Allowed
- 72 Paper but Electronic Allowed
- 50 Remitter ID Required

Things TO DO

SUI Rate Exchanges of now

DISPLAY ALL STATES

| STATE | EXCHANGE METHOD | COMPANY COUNT | LAST SUI RATE IMPORT |
|---|---|---|---|
| Alabama | FTP | 53 | 08/03/2021 (3) |
| Alaska | Client | 0 | |
| Arizona | Download | 124 | 08/03/2021 (3) |
| Arkansas | Download | 37 | 08/03/2021 (3) |
| California | eFile | 115 | 08/03/2021 (3) |
| Colorado | Email | 50 | 08/03/2021 (3) |
| Connecticut | FTP | 53 | 08/03/2021 (3) |
| Delaware | CD | 35 | 08/03/2021 (3) |
| District of Columbia | FTP | 55 | 08/03/2021 (3) |
| Florida | Email | 112 | 08/03/2021 (3) |
| Georgia | CD | 69 | 08/03/2021 (3) |

Newly Supported Electronic Payments

Lorem ipsum dolor sit amet, consectetur adipiscing elit, sed do eiusmod tempor incididunt ut labore et dolore magna aliqua. Donec ultrices tincidunt arcu non sodales neque sodales. Mi eget mauris pharetra et. Molestie ac feugiat sed lectus vestibulum mattis ullamcorper velit. Mauris in aliquam sem fringilla ut morbi. Nec ullamcorper sit amet risus nullam eget felis eget nunc

Newly Supported Electronic Filings

Cras semper auctor neque vitae tempus quam pellentesque nec nam. Enim diam vulputate ut pharetra. Consectetur adipiscing elit ut aliquam purus sit amet luctus. Tortor consequat id porta nibh. Nibh nisl condimentum id venenatis a condimentum vitae sapien pellentesque. Hendrerit gravida rutrum quisque non tellus orci ac. Amet consectetur adipiscing elit duis.

300 — DASHBOARD

FIG. 6

MasterTax USA Payroll Tax Workspace — JSMITH
Wed Aug 18 2021 14:57:32 GMT-0700 (Mountain Standard Time)  Service Provider - MTQ11 (ID# 11645)
Quarter: 2021 Q2

System settings | Jurisdictions | Companies     ▽ SEARCH & FILTERS (0)

Dashboard
Prepare
Interim
Reconcile
File/Pay

Company Tax Profile As of now
- Check but EFT Debit Allowed: 5,085
- Check but EFT Credit Allowed: 3,601
- Prior Year SUI Rate: 2,829
- EFT Debit but EFT Credit Allowed: 1,542
- Invalid EIN: 903
- Paper Filing Method Override: 776
- Applied for but EIN Required: 326
- Remitter ID Override: 34
- Suppressed Tax Forms: 8

702 CHART

▽ Things TO DO

Company Tax History As of now
- No Payroll Tax Liabilities in the Quarter: 2,212
- No Payroll Tax Liabilities in the Year Prior to the Quarter: 2,175
- Returns Not Yet Filed for the Previous Quarter: 51
- Pending Recon Transactions Exist for the Previous Quarter: 39
- Returns Not Yet Created for the Previous Quarter: 35

704 CHART

300 DASHBOARD

DASHBOARD INTERFACE DATA RECONCILIATION AND TASK PROCESSING

BACKGROUND

1. Field

The disclosure relates generally to an improved computer system and, more specifically, to a method, apparatus, computer system, and computer program product for data reconciliation and task processing implemented in a dashboard interface.

2. Description of the Related Art

One of the problems facing the users of computing devices with large amounts of data relative to display screen real estate is how to allow the user to navigate quickly and efficiently to access data. In conventional user interfaces, a user may need to horizontally scroll around, switching views many times to find the right data/functionality.

Often, the absolute volume of information precludes a user from simultaneously viewing relevant information. Information displayed in disparate columns of multiple column grids can require a huge horizontal scroll, often hiding columns of information as new columns are scrolled into and out of view. For example, when the user scrolls to columns on the left side of a data grid, columns on the far-right side of the data grid can be hidden under the horizontal scroll. The user cannot relate which row and label to refer as the primary detail is hidden by the scroll.

For example, in a human resources environment, compensation data for company employees often have numerous parameters, fields, figures, and values that must be accessed and compared when performing human resource operations. Because of the substantial number of columns and rows in which relevant data is displayed, the user must often scroll tables of relevant information to display old data, new data, or comparative data. However, the scrolling process often obscures relevant data, making a comparison between different data values more difficult than desired, and making it harder for a user to appreciate correlations between different data values.

Therefore, it would be desirable to have a method and apparatus that take into account at least some of the issues discussed above, as well as other possible issues.

SUMMARY

According to one embodiment of the present invention, a method provides for data reconciliation and task processing implemented in a dashboard interface. The method comprises: displaying, by a computer system, a dashboard interface having a number of tabs that correspond to categorical processing steps, vertically arranged along an edge of the dashboard, wherein the number of tabs include at least an overview tab, a configuration tab, a reconciliation tab, and a transaction tab; retrieving, by the computer system, a number of selectable parameters selected from the configuration tab; aggregating, by a computer system, data across multiple database tables according to the selected parameters; processing, by a computer system, the aggregated data according to the selected parameters; and in response to a selection of a categorical processing steps, displaying, by a computer system, the aggregated data on the dashboard interface as a series of cards arranged horizontally according to a logical sequence of user interactions, wherein at least one card includes a visualization of the aggregated data that is displayed in a progressive format that enables a user to drill-down into data details of a selected segment of the visualization.

According to another embodiment of the present invention, a computer system comprises a hardware processor, and a dashboard interface for data reconciliation and task processing. The hardware processor executes program code to perform a method of: displaying a dashboard interface having a number of tabs that correspond to categorical processing steps, vertically arranged along an edge of the dashboard, wherein the number of tabs include at least an overview tab, a configuration tab, a reconciliation tab, and a transaction tab; retrieving, by the computer system, a number of selectable parameters selected from the configuration tab; aggregating data across multiple database tables according to the selected parameters; processing the aggregated data according to the selected parameters; and in response to a selection of a categorical processing steps, displaying the aggregated data on the dashboard interface as a series of cards arranged horizontally according to a logical sequence of user interactions, wherein at least one card includes a visualization of the aggregated data that is displayed in a progressive format that enables a user to drill-down into data details of a selected segment of the visualization.

According to yet another embodiment of the present invention, a computer program product comprises a computer-readable storage media with program code stored on the computer-readable storage media for data reconciliation and task processing implemented in a dashboard interface. The program code is executable by a computer system to perform a method of: displaying a dashboard interface having a number of tabs that correspond to categorical processing steps, vertically arranged along an edge of the dashboard, wherein the number of tabs include at least an overview tab, a configuration tab, a reconciliation tab, and a transaction tab; retrieving, by the computer system, a number of selectable parameters selected from the configuration tab; aggregating data across multiple database tables according to the selected parameters; processing the aggregated data according to the selected parameters; and in response to a selection of a categorical processing steps, displaying the aggregated data on the dashboard interface as a series of cards arranged horizontally according to a logical sequence of user interactions, wherein at least one card includes a visualization of the aggregated data that is displayed in a progressive format that enables a user to drill-down into data details of a selected segment of the visualization.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 6 is a fourth view of a graphical user interface depicted in accordance with an illustrative embodiment;

FIG. 7 is a fifth view of a graphical user interface depicted in accordance with an illustrative embodiment;

FIG. 8 is a sixth view of a graphical user interface depicted in accordance with an illustrative embodiment;

FIG. 9 is a seventh view of a graphical user interface depicted in accordance with an illustrative embodiment;

FIG. 10 is an eighth view of a graphical user interface depicted in accordance with an illustrative embodiment;

FIG. 11 is a ninth view of a graphical user interface depicted in accordance with an illustrative embodiment;

DETAILED DESCRIPTION

Figure 1:
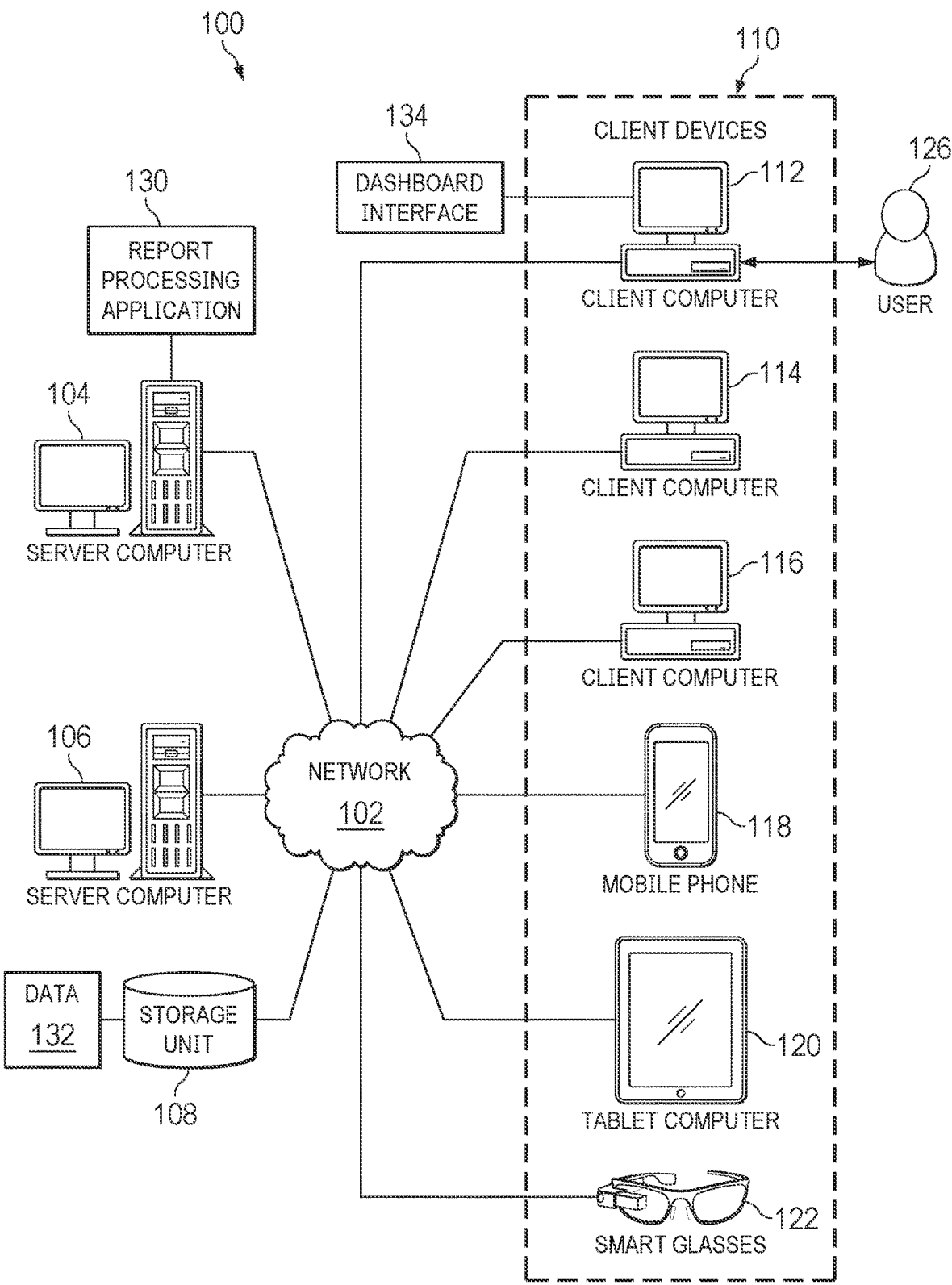
FIG. 1 is a pictorial representation of a network of data processing systems in which illustrative embodiments may be implemented.

The illustrative embodiments recognize and take into account one or more different considerations. For example, the illustrative embodiments recognize and take into account that software applications for report processing have a mature set of utilities and configuration settings which the user would have needed training to know where to find the utilities and what circumstances where they were needed. The software is not intuitive without user training.

The illustrative embodiments further recognize and take into account that software applications for processing reports are often unable to access aggregated real-time processing data. As a work around, users often have to run various reports, download those reports to an external spreadsheet application, and then aggregate the data manually outside the system. This data was only relevant at the time the reports were downloaded. This process is not intuitive and extremely time-consuming to the user.

The illustrative embodiments further recognize and take into account that to access errors and exceptions, currently available software applications for processing reports require users to run and export reports and/or data extracts from the system. Then the user must aggregate the downloaded information to understand the actions required to resolve the exception. This process is very labor intensive and can occur every time a client imports any transactional data into the software application.

Thus, the illustrative embodiments recognize and take into account that it would be desirable to have a method, apparatus, computer system, and computer program product that takes into account the issues discussed above as well as other possible issues. For example, it would be desirable to have a method, apparatus, computer system, and computer program product that intelligently guides the user through report processing while progressively disclosing data/information at the appropriate time in the process. Furthermore, the illustrative embodiments recognize and take into account that it would be desirable to have a method, apparatus, computer system, and computer program product that displays pictorial representations of imported data and a comparison of imported data against existing system data to the user.

Therefore, the illustrative embodiments described herein provide a method, apparatus, computer system, and computer program product that enable report processing that is easier to understand and follow without significant knowledge of the software, utilities, and configurations. The compliance system includes a dashboard that displays graphs and charts of aggregated real-time data to the user, eliminating the need to spend extensive effort exporting reports and/or data extracts to manually aggregate the same data. The user can spend time on the processing exceptions and errors and focus on important actionable data resulting in less effort and improved client efficiencies.

In one illustrative example, a computer system is provided for data reconciliation and task processing implemented in a dashboard interface. The computer system displays a dashboard interface having a number of tabs that correspond to categorical processing steps for the task, vertically arranged along an edge of the dashboard, wherein the number of tabs include at least an overview tab, a configuration tab, a reconciliation tab, and a transaction tab. The computer system retrieves a number of selectable parameters selected from the configuration tab. The computer system aggregates data across multiple database tables according to the selected parameters. The computer system processes the aggregated data according to the selected parameters. In response to a selection of a tab, the computer system displays the aggregated data on the dashboard interface as a series of cards arranged horizontally according to a logical sequence of user interactions, wherein at least one card includes a visualization of the aggregated data that is displayed in a progressive format that enables a user to drill-down into data details of a selected segment of the visualization.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage media and downloaded to a data processing system or other device for use. For example, the program code can be stored on a computer-recordable storage media on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, a "number of," when used with reference to items, means one or more items. For example, a "number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, report processing application 130 can be run in a remote location such as on server computer 104. In another illustrative example, report processing application 130 can run on client computer 114 and can take the form of a system instance of an application. In yet other illustrative examples, report processing application 130 can be distributed in multiple locations within network data processing system 100. For example, report processing application 130 can run on client computer 112 and on client computer 114 or on client computer 112 and server computer 104 depending on the particular implementation.

Report processing application 130 can operate to provide for data reconciliation and task processing implemented in a dashboard interface 134. As used herein, a "dashboard" is a type of graphical user interface which presents information to the user. For example, dashboard interface 134 can present a unified set of data about a series of disparate topics.

The report processing application 130 displays a dashboard interface 134 having a number of tabs that correspond to categorical processing steps for the task, vertically arranged along an edge of the dashboard interface 134. The number of tabs include at least an overview tab, a configuration tab, a reconciliation tab, and a transaction tab. The report processing application 130 retrieves a number of selectable parameters selected from the configuration tab of the dashboard interface 134. The report processing application 130 aggregates data 132 across multiple database tables according to the selected parameters. The report processing application 130 processes the aggregated data according to the selected parameters. In response to a selection of a tab from dashboard interface 134, the report processing application 130 displays the aggregated data on the dashboard interface 134 as a series of cards arranged horizontally according to a logical sequence of user interactions. At least one card includes a visualization of the aggregated data that is displayed in a progressive format that enables user 126 to drill-down into data details of a selected segment of the visualization.

In one or more illustrative embodiments, dashboard interface 134 solves problems of prior graphical user interface devices (GUIs), in the context of computerized report processing, relating to speed, accuracy, and usability. Rather than reciting a mathematical algorithm, a fundamental economic or longstanding commercial practice, or a challenge in business, dashboard interface 134 improves on existing graphical user interface devices that do not have a pre-electronic analog. The embodiments of dashboard interface 134 provides significantly more than prior graphical user interface devices that merely allow for setting, displaying, and selecting data or information that is visible on a graphical user interface device. Instead, dashboard interface 134 utilizes a specific, structured interface directly related a prescribed functionality that resolves a specifically identified problem of accessing aggregated real-time processing data when processing reports.

Furthermore, the specific structure and concordant functionality of dashboard interface 134 distinguishes this system as compared to conventional computer implementations of known procedures. The function of dashboard interface 134 is not simply the generalized use of computer system 204 as a tool to conduct a known or obvious process. Instead, dashboard interface 134 provides an inventive concept that enables report processing that is easier to understand and follow without significant knowledge of the software, utilities, and configurations, eliminating the need to spend extensive effort exporting reports and/or data extracts to manually aggregate the same data, resulting in less effort and improved client efficiencies. Rather than the routine or conventional use of computers or the Internet, dashboard interface 134 overcomes problems that are necessarily rooted in computer technology and that specifically arise in the realm of computer networks, resulting in an improvement to the capabilities of report processing application 130, as well as one or more of client devices 110, server computer 104.

Figure 2:
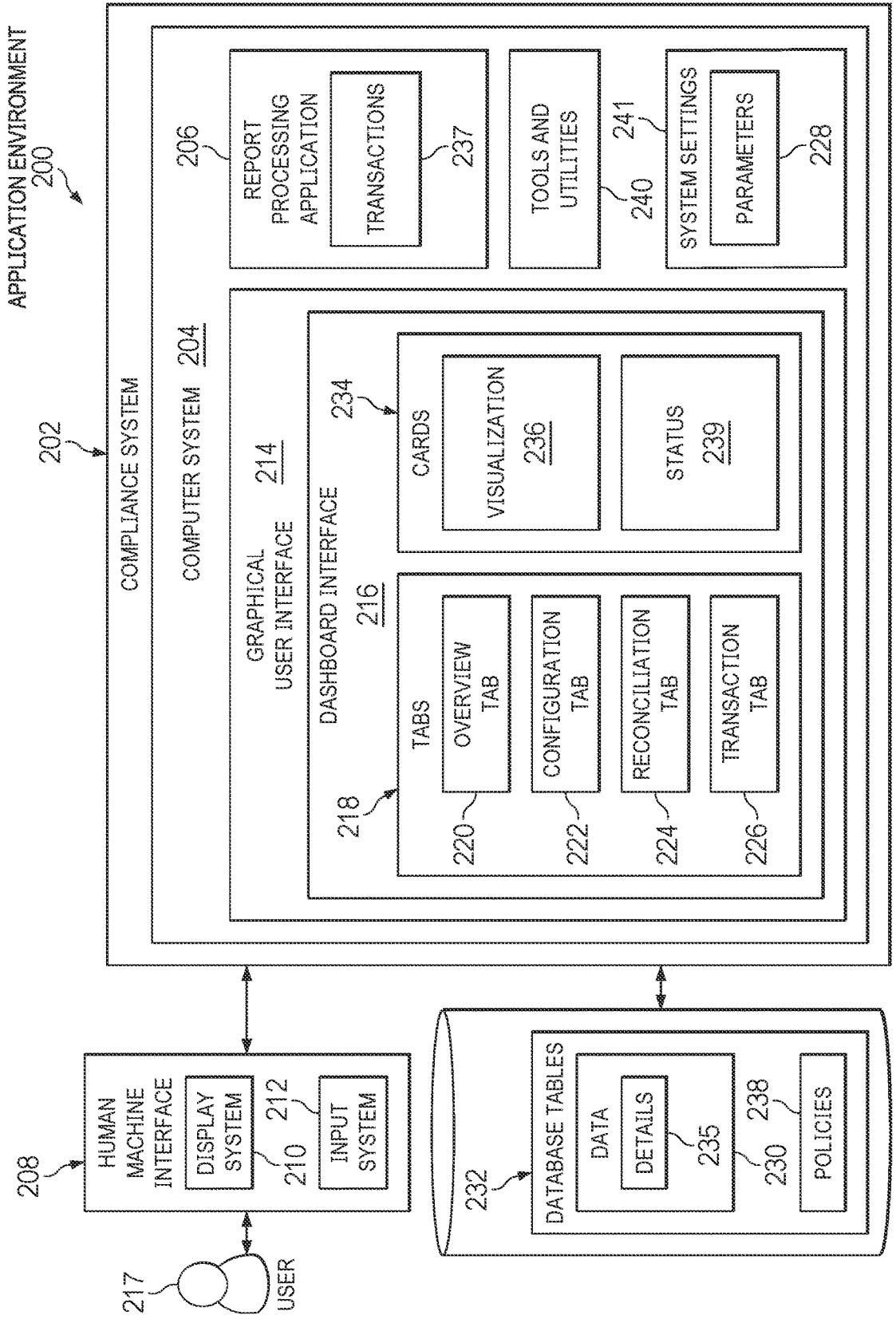
FIG. 2 is block diagram of an application environment depicted in accordance with an illustrative embodiment.

With reference now to FIG. 2, a block diagram of an application environment is depicted in accordance with an illustrative embodiment. In this illustrative example, application environment 200 includes components that can be implemented in hardware such as the hardware shown in network data processing system 100 in FIG. 1.

As depicted, compliance system 202 comprises computer system 204 and report processing application 206. Report processing application 206 runs in computer system 204. Report processing application 206 can be implemented in software, hardware, firmware, or a combination thereof. When software is used, the operations performed by report processing application 206 can be implemented in program code configured to run on hardware, such as a processor unit. When firmware is used, the operations performed by report processing application 206 can be implemented in program code and data and stored in persistent memory to run on a processor unit. When hardware is employed, the hardware may include circuits that operate to perform the operations in report processing application 206.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 204 is a physical hardware system and includes one or more data processing systems. When more than one data processing system is present in computer system 204, those data processing systems are in communication with each other using a communications medium. The communications medium can be a network. The data processing systems can be selected from at least one of a computer, a server computer, a tablet computer, or some other suitable data processing system.

As depicted, human machine interface 208 comprises display system 210 and input system 212. Display system 210 is a physical hardware system and includes one or more display devices on which graphical user interface 214 can be displayed. The display devices can include at least one of a light emitting diode (LED) display, a liquid crystal display (LCD), an organic light emitting diode (OLED) display, a computer monitor, a projector, a flat panel display, a heads-up display (HUD), or some other suitable device that can output information for the visual presentation of information.

User 217 is a person that can interact with graphical user interface 214 through user input generated by input system 212 for computer system 204. Input system 212 is a physical hardware system and can be selected from at least one of a mouse, a keyboard, a trackball, a touchscreen, a stylus, a motion sensing input device, a gesture detection device, a cyber glove, or some other suitable type of input device.

In one or more illustrative embodiments, graphical user interface 214 text form of dashboard interface 216. Dashboard interface 216 is an example of dashboard interface 134 of FIG. 1.

In this illustrative example, human machine interface 208 can enable user 217 to interact with one or more computers or other types of computing devices in computer system 204. For example, these computing devices can be client devices such as client devices 110 in FIG. 1.

In this illustrative example, report processing application 206 in computer system 204 is configured for data reconciliation and task processing using a dashboard interface 216. Report processing application 206 displays a dashboard interface 216 having a number of tabs 218 that correspond to categorical processing steps for the task. Tabs 218 are vertically arranged along an edge of the dashboard interface 216. Tabs 218 include at least an overview tab 220, a configuration tab 222, a reconciliation tab 224, and a transaction tab 226.

Report processing application 206 retrieves a number of selectable parameters 228, selected from the configuration tab 222. Parameters 228 can be selected by user 217, interacting with dashboard interface 216.

Report processing application 206 aggregates data 230 across multiple database tables 232 according to the selected parameters 228. Report processing application 206 processes the aggregated data according to the selected parameters 228.

In response to a selection of one of tabs 218, report processing application 206 displays the aggregated data as a series of cards 234, arranged horizontally on the dashboard interface 216 according to a logical sequence of user interactions. At least one card includes a visualization 236 of the aggregated data. Visualization 236 is displayed in a progressive format that enables these are 216 to drill-down into details 235 of a selected segment of the visualization 236. As used herein, details 235 are a more granular visualization of data 230. Details can be presented at any level of abstraction, down to the atomic data granularity stored in database tables 232.

In one illustrative example, report processing application 206 displays status 239 for data reconciliation and transactions for a selected time interval. The status 239 of the transactions can be displayed on one of cards 234 in the overview tab 220 of dashboard interface 216. Status 239 is displayed at summary level of all relevant information according to the progressive format.

In one illustrative example, report processing application 206 displays consolidated system settings 241 by category on one of cards 234 in the configuration tab 222. The consolidated system settings 241 are displayed so as to preemptively and proactively highlights settings that are required for generating transactions 237 according to one or more of compliance policies 238.

In one illustrative example, report processing application 206 displays a set of tools and utilities 240 for reconciling the data 230 with a number of compliance policies 238. For example, according to one use case, compliance policies 238 are one or more policies related to quarterly filings of payroll taxes. Report processing application 206 displays a set of tools and utilities 240 on one of cards 234 of the reconciliation tab 224. Responsive to a selection of the tools and utilities 240, report processing application 206 updates one or more of the multiple database tables 232 according to the data 230 that was reconciled.

In one illustrative example, report processing application 206 generates transactions 237 in response to selection of a control element from the transactions tab 226. Report processing application 206 then forwarding the transaction to a third-party regulatory agency.

In one illustrative example, one or more solutions are present that overcome a problem with data reconciliation and task processing. As a result, one or more illustrative examples may provide for data reconciliation and task processing in a dashboard interface 216. Dashboard interface 216 displays data as a series of cards arranged horizontally according to a logical sequence of user interactions, wherein at least one card includes a visualization of the aggregated data that is displayed in a progressive format that enables a user to drill-down into data details of a selected segment of the visualization. Dashboard interface 216 displays data 230 in a manner that enables report processing that is easier to understand and follow without significant knowledge of the software, utilities, and configurations, eliminating the need to spend extensive effort exporting reports and/or data extracts to manually aggregate the same data, resulting in less effort and improved client efficiencies.

Computer system 204 can be configured to perform at least one of the steps, operations, or actions described in the different illustrative examples using software, hardware, firmware, or a combination thereof. As a result, computer system 204 operates as a special purpose computer system in report processing application 206 in computer system 204. In particular, report processing application 206 transforms computer system 204 into a special purpose computer system as compared to currently available general computer systems that do not have report processing application 206. In this example, computer system 204 operates as a tool that can increase at least one of speed, accuracy, or usability of computer system 204. In particular, this increase in performance of computer system 204 can be for the use of report processing application 206 by user 217. In one illustrative example, dashboard interface 216 provides for increased comprehension and speed at which data, such as data 230, can be accessed, aggregated, and processed by user 217 as compared with using current systems.

The illustration of application environment 200 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Turning now to FIGS. 3-11, illustrations of a use case of a report processing application for tax processing and reporting software depicted in accordance with an illustrative embodiment. The graphical user interface displays aggregated data within the different windows of a report processing application. The dashboard design utilizes graphs and charts to access to real-time aggregated data, which are easier for the user to understand and comprehend, thereby saving time and improving operator efficiency. As depicted, dashboard 300 is one example implementation of dashboard interface 134 in FIG. 1 and dashboard interface 216 in FIG. 2.

As depicted, dashboard 300 provides a graphical user interface for the user to select reports generated over a time period, such as quarterly and yearly data that can be viewed, managed, and processed. Dashboard 300 of cap FIGS. 3-11 illustrates a use case for a tax software application.

Figure 3:
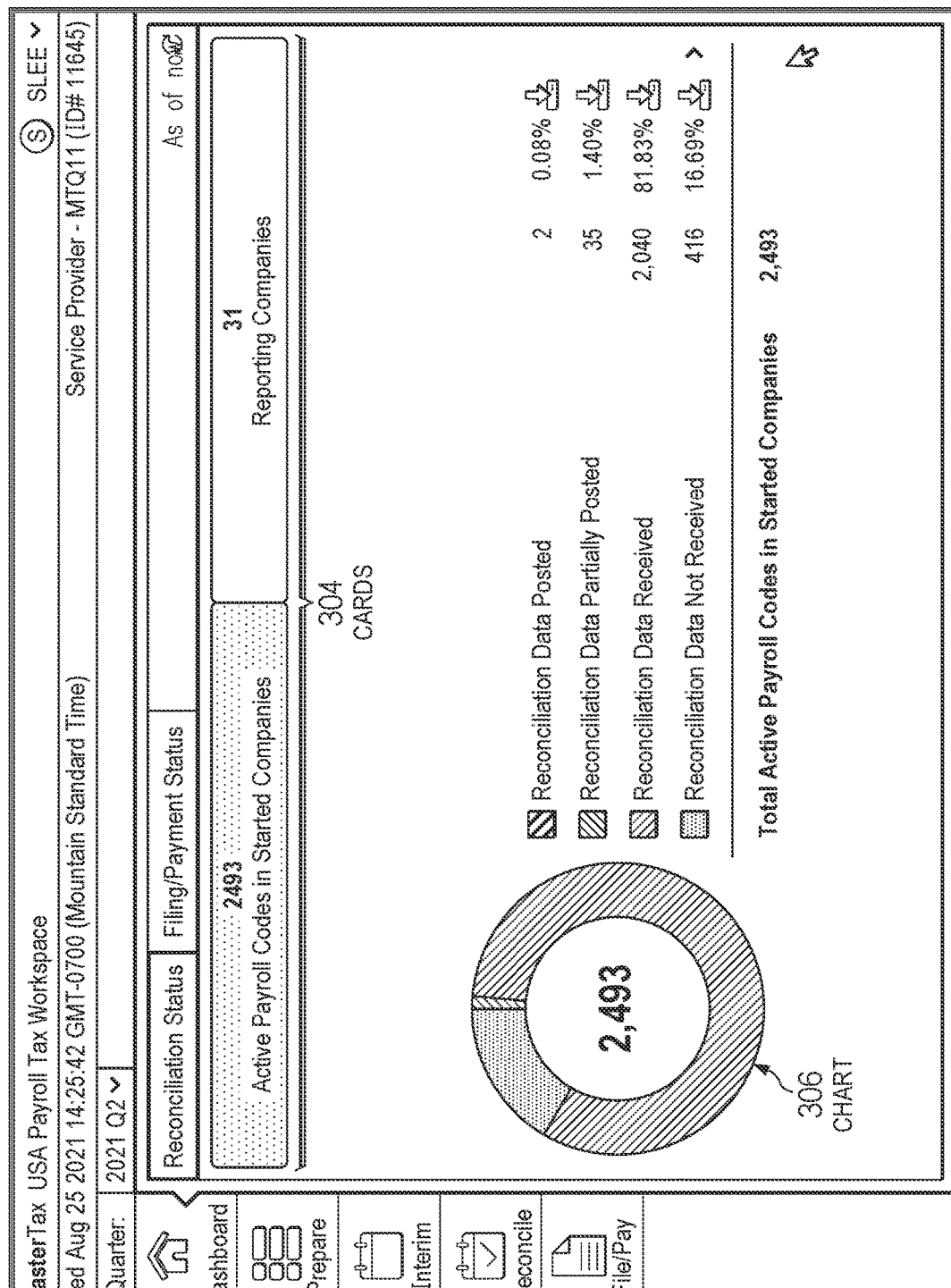
FIG. 3 is a first view of a graphical user interface depicted is depicted in accordance with an illustrative embodiment.

With reference to FIGS. 3, a graphical user interface is depicted is depicted in accordance with an illustrative embodiment. As depicted, dashboard 300 illustrates a first example implementation of overview tab 220 of dashboard interface 216 in FIG. 2.

In this illustrative example, overview tab 220 takes the form of dashboard tab 302. Selection of dashboard tab 302 provides a high-level executive view of tax filing and reconciliation status, such as data 230 of FIG. 2, that targets the executive payroll tax management persona.

In this illustrative example, dashboard 300 includes one or more cards 304. Cards 304 are an example of cards 234 shown in block form in FIG. 2. Cards 304 are arranged horizontally according to a logical sequence of user interactions, with at least one of cards 304 including a visualization of the aggregated data that is displayed in a progressive format.

As depicted, and "reconciliation status" card is selected, displaying a high-level view of active payroll codes across a number of client companies. The data, which can be, for example, data 230 of FIG. 2, is aggregated from a number of different database tables, such as database tables 232 of FIG. 2, and displayed in a graphical format, such as chart 306.

Chart 306 is an example of visualization 236 of FIG. 2. Chart 306 is interactive, enabling the user to click on separate segments of the chart or graph, which can be distinguished by color coding. By selecting one of the segments, a user can progressively drill-down into the details of high-level data of the active payroll codes shown in chart 306. The details are displayed on the screen in either another graphical representation or detailed representation that the user can view on screen or export. For example, selection of dashboard tab 302 displays a view of payroll tax data that enables the user to drill-down into companies and/or tax code level to understand status of active companies filing process and payments at any point in time the status of payroll tax management for a selected quarter or annual filing.

Figure 4:
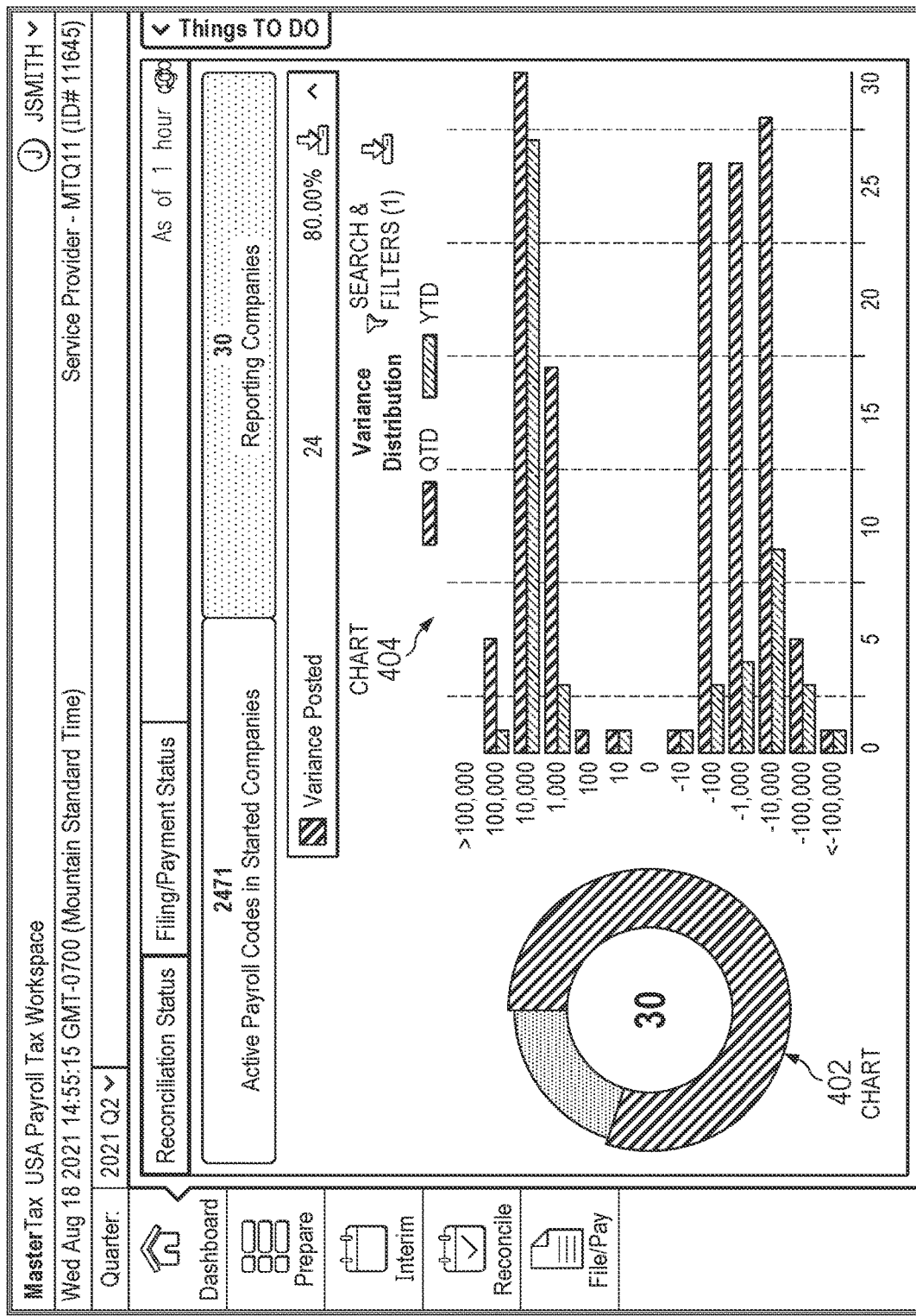
FIG. 4 is a second view of a graphical user interface depicted in accordance with an illustrative embodiment.

With reference to FIG. 4, a graphical user interface is depicted in accordance with an illustrative embodiment. As depicted, dashboard 300 illustrates a second example implementation of overview tab 220 of dashboard interface 216 in FIG. 2.

As depicted, a "reconciliation status" card is selected, displaying a high-level view of reporting companies, aggregated from a number of different database tables, such as database tables 232 of FIG. 2, and displayed in a graphical format, such as chart 402.

Chart 402 and chart 404 are examples of visualization 236 of FIG. 2. Chart 402 and chart 404 are interactive, enabling the user to click on separate segments of the chart or graph, which can be distinguished by color coding. By selecting one of the segments, a user can progressively drill-down into the details of high-level data of the reporting companies.

Figure 5:
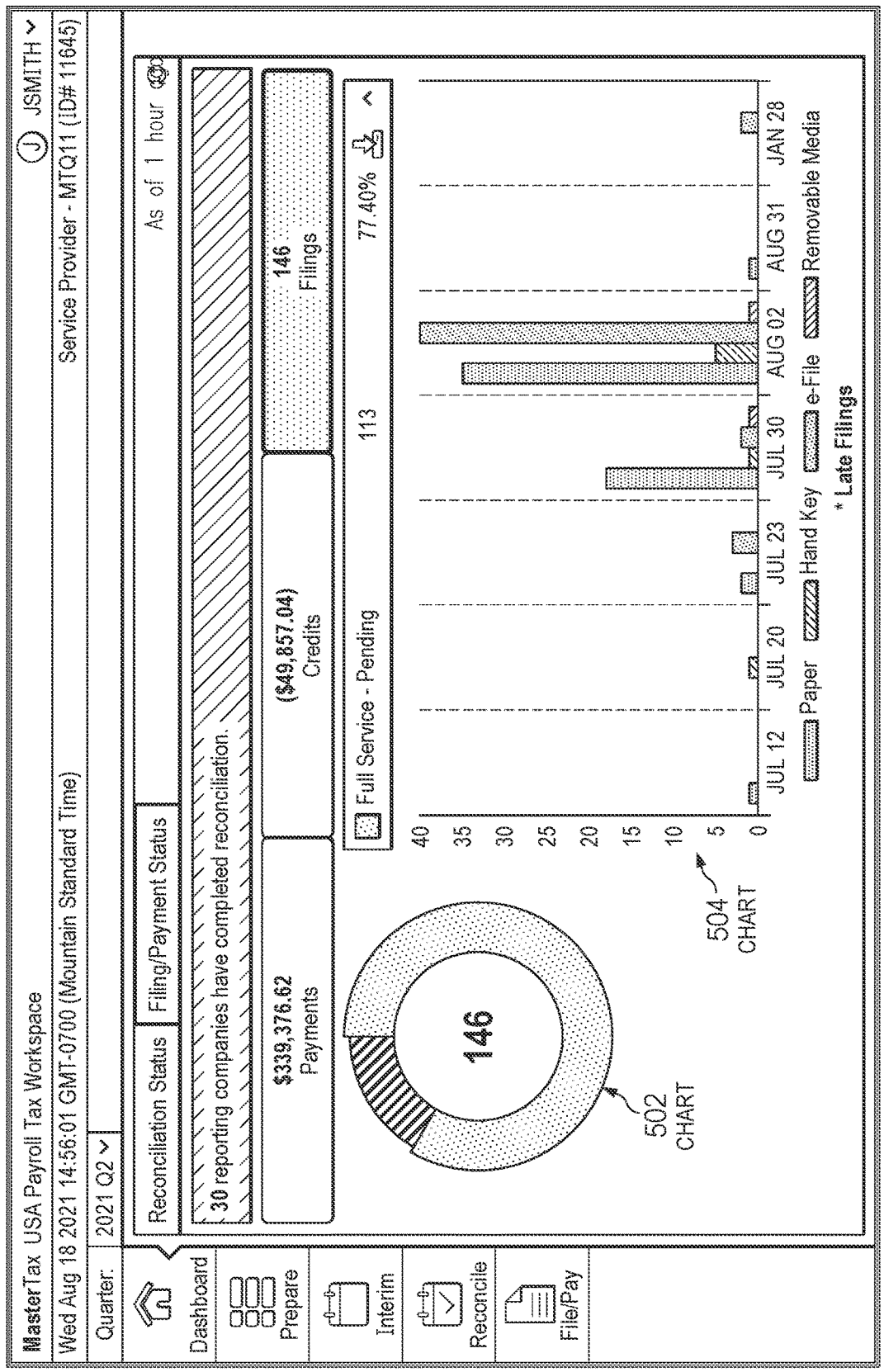
FIG. 5 is a third view of a graphical user interface depicted in accordance with an illustrative embodiment.

With reference to FIG. 5, a graphical user interface is depicted in accordance with an illustrative embodiment. As depicted, dashboard 300 illustrates one example implementation of overview tab 220 of dashboard interface 216 in FIG. 2.

As depicted, a "filing payment status" card is selected, displaying a high-level view of tax filing status for reporting companies, aggregated from a number of different database tables, such as database tables 232 of FIG. 2, and displayed in a graphical format, such as chart 502.

Chart 502 and chart 504 are examples of visualization 236 of FIG. 2. Chart 502 and chart 504 are interactive, enabling the user to click on separate segments of the chart or graph, which can be distinguished by color coding. By selecting one of them, a user can progressively drill-down into the details of high-level data of the tax filing status.

With reference to FIG. 6, a graphical user interface is depicted in accordance with an illustrative embodiment. As depicted, dashboard 300 illustrates one example implementation of configuration tab 222 of dashboard interface 216 in FIG. 2.

As depicted, a "jurisdictions" card is selected, displaying a high-level view of reporting companies, aggregated from a number of different database tables, such as database tables 232 of FIG. 2, and displayed in a graphical format. "Jurisdictions" area preemptively and proactively highlights jurisdiction and company settings within the reporting application that are required for filing and processing payroll taxes need attention prior to processing of quarterly payroll taxes. Selecting the "jurisdictions" card also provides the user with any newly supported electronic payments and filings. Consolidated system settings can be accessed respectively from the "System Settings" card.

With reference to FIG. 7, a graphical user interface is depicted in accordance with an illustrative embodiment. As depicted, dashboard 300 illustrates a second example implementation of configuration tab 222 of dashboard interface 216 in FIG. 2.

As depicted, a "companies" card is selected, displaying a high-level view of tax profiles and histories for a number of reporting companies, aggregated from a number of different database tables, such as database tables 232 of FIG. 2, and displayed in a graphical format. Chart 702 and chart 704 are examples of visualization 236 of FIG. 2. Chart 702 and chart 704 are interactive, enabling the user to click on separate segments to progressively drill-down into the details of high-level data.

Figure 8:
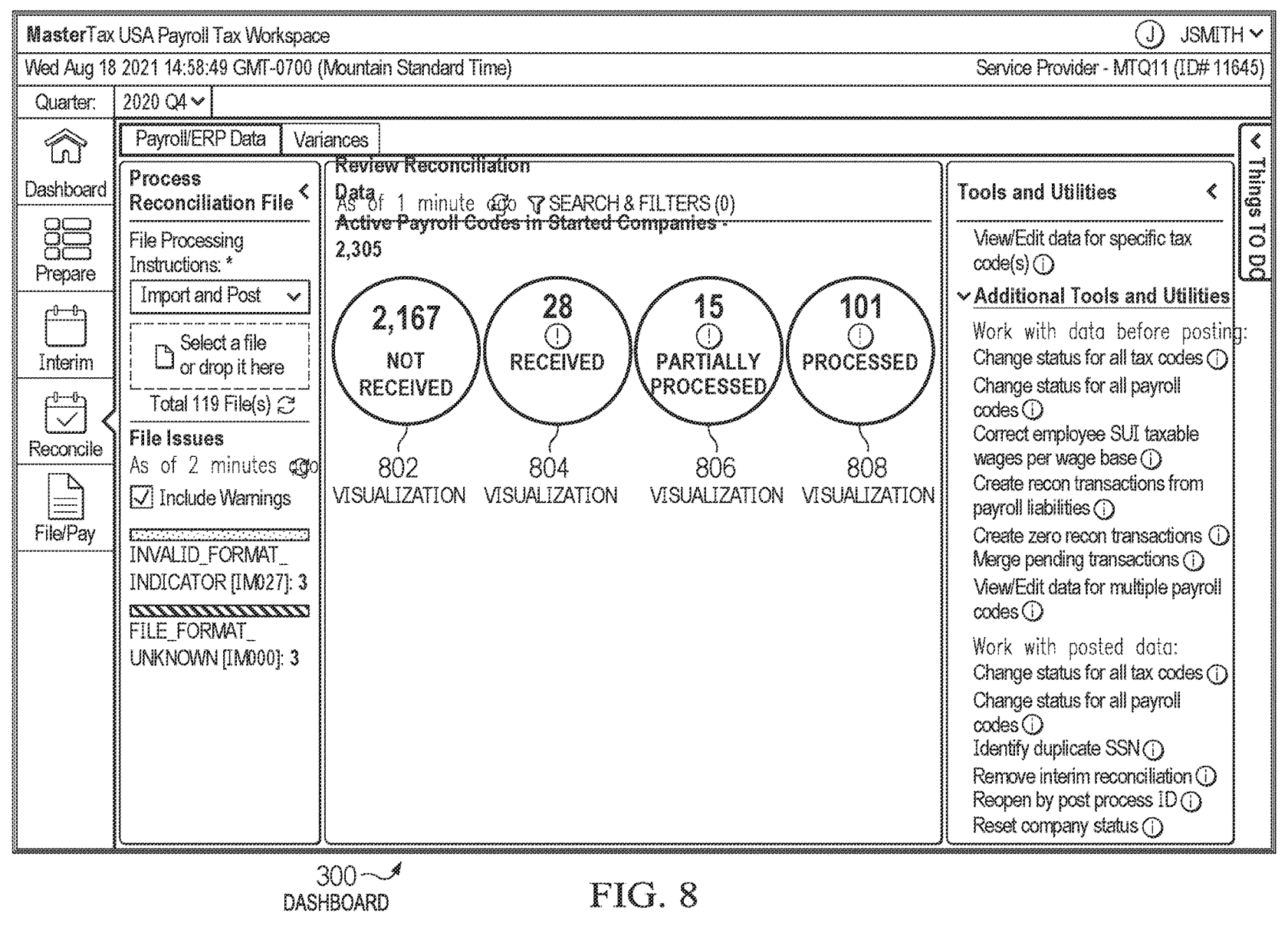

With reference to FIG. 8, a graphical user interface is depicted in accordance with an illustrative embodiment. As depicted, dashboard 300 illustrates one example implementation of reconciliation tab 224 of dashboard interface 216 in FIG. 2.

As depicted, the "Reconcile" card is selected, allowing the user to drag and drop reconciliation files for processing. The "Reconcile" card provides a visual onscreen log of imported files and summarizes the imported data for the user in a graphical format. The "Reconcile" card provides the user with a graphically representation of what companies and payroll codes data have been received, as well as those which have not been received, including how many of those companies and payroll codes have been processed or partially processed. This area allows the user to import reconciliation data, manage exceptions/errors, view variances, validate variances, and post transactions so that they can generate the tax return and pay payroll taxes to the agencies.

Visualization 802, 804, 806, and 808 are examples of visualization 236 of FIG. 2. As with the other data visualizations described herein, visualization 802, 804, 806, and 808 are interactive. Selecting a corresponding visualization enables a user to drill-down in any of these areas to view and manage exceptions and errors (FIG. 9), edit reconciliation data (FIG. 10), and post transactions (FIG. 11).

Figure 9:
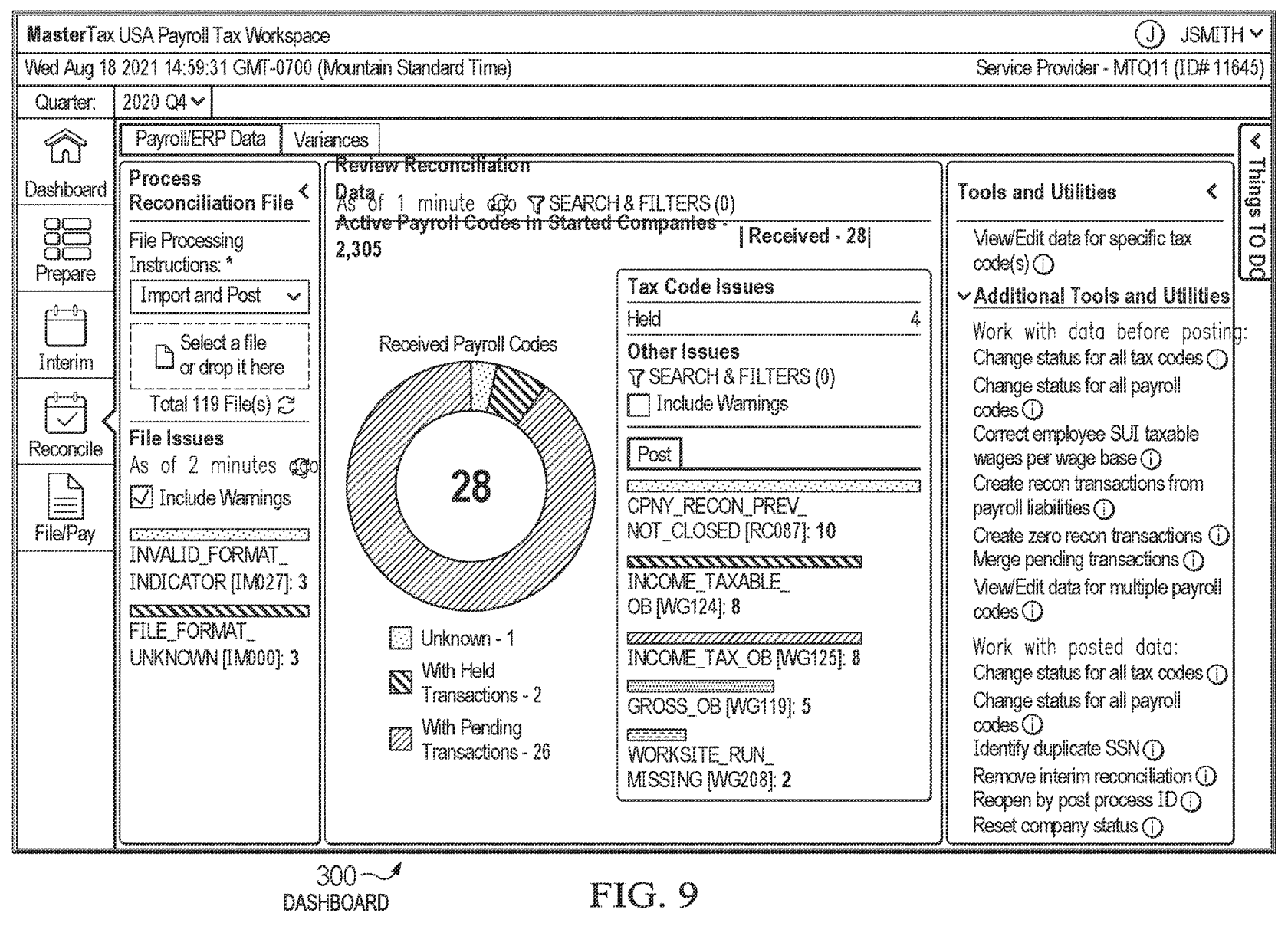

With reference to FIG. 9, a graphical user interface is depicted is depicted in accordance with an illustrative embodiment. As depicted, dashboard 300 illustrates one example implementation of reconciliation tab 224 of dashboard interface 216 in FIG. 2 for viewing and managing exceptions and errors.

Figure 10:
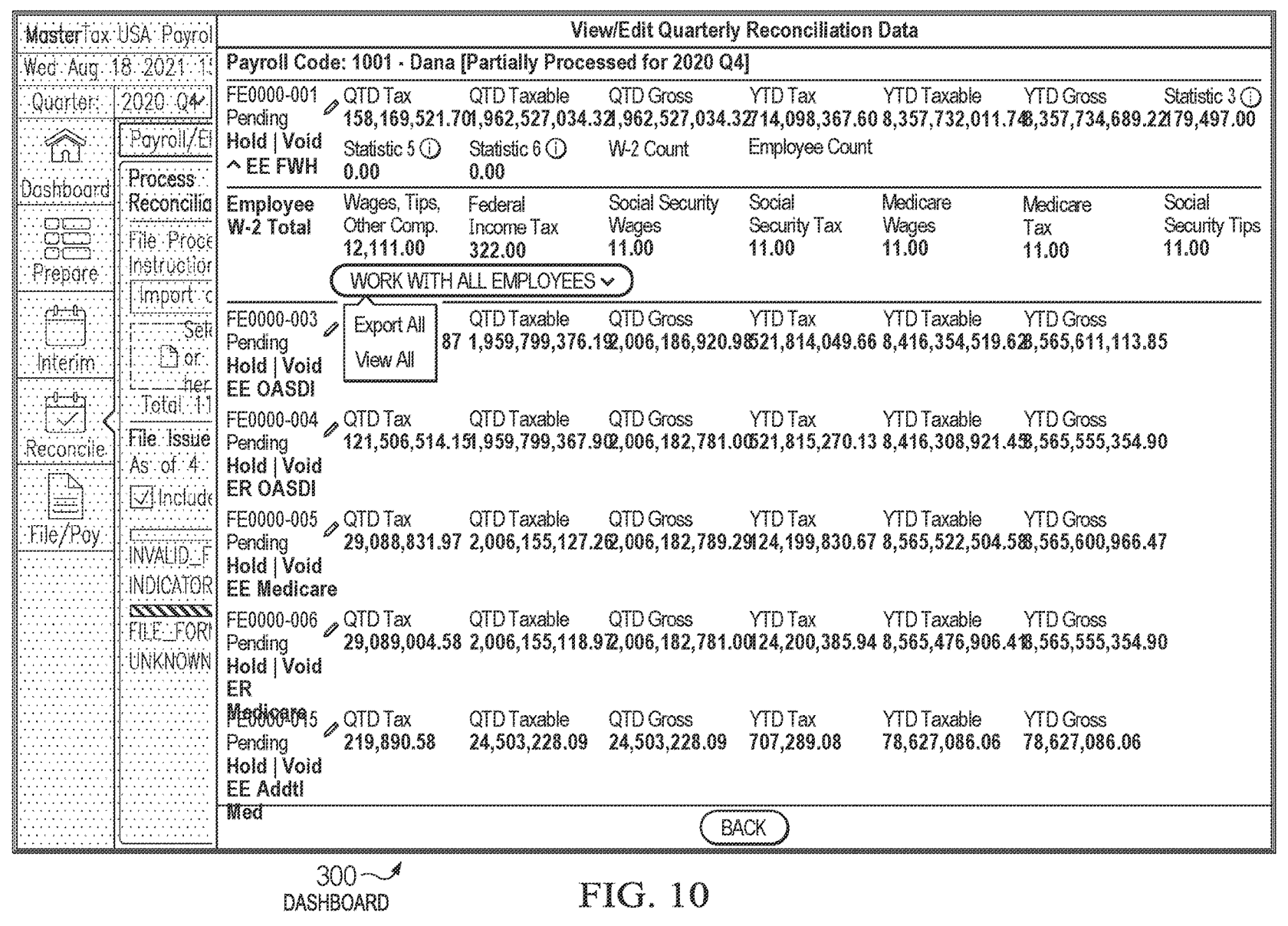

With reference to FIG. 10, a graphical user interface is depicted is depicted in accordance with an illustrative embodiment. As depicted, dashboard 300 illustrates one example implementation of reconciliation tab 224 of dashboard interface 216 in FIG. 2 for editing reconciliation data.

Figure 11:
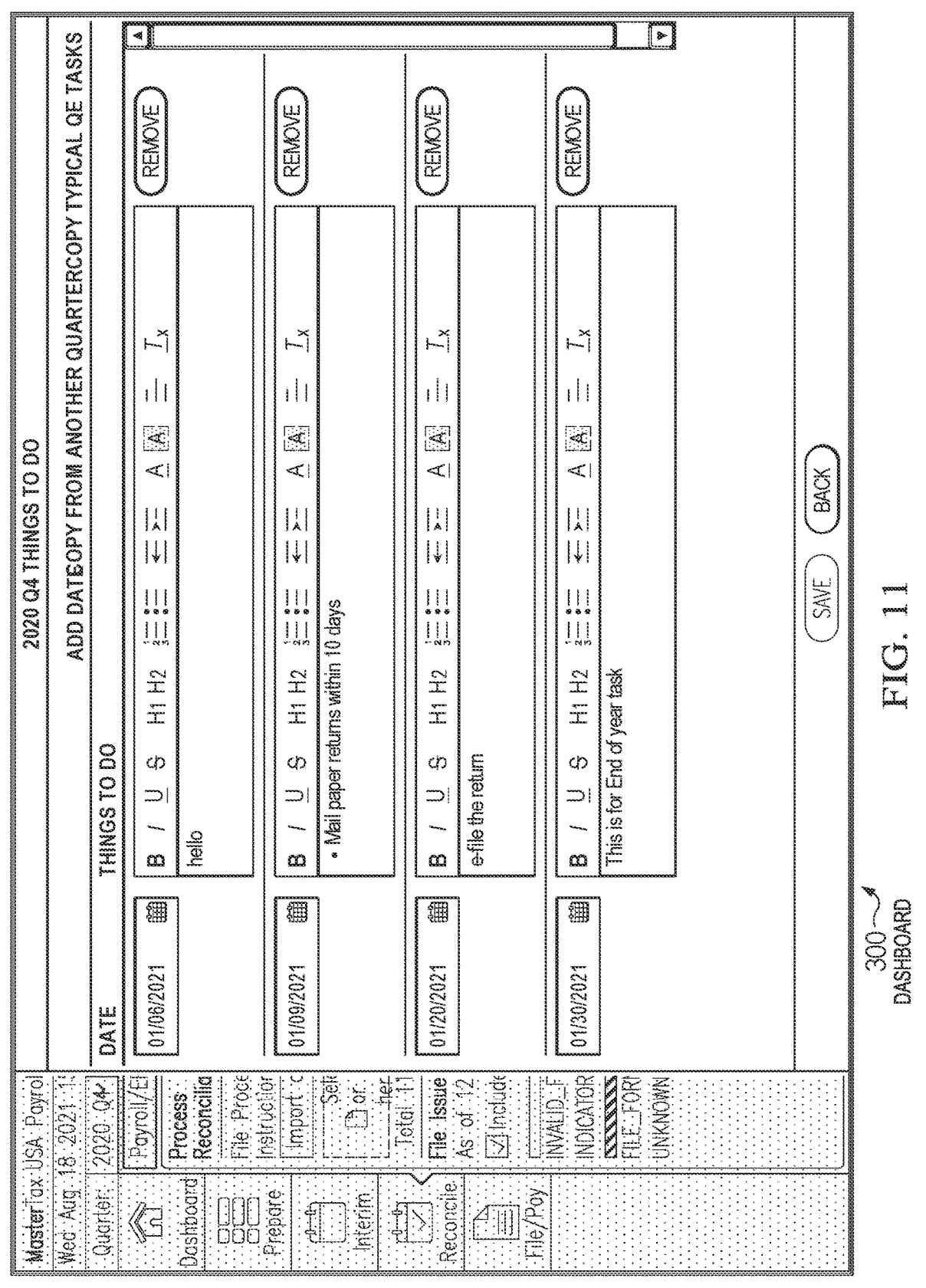

With reference to FIG. 11, a graphical user interface is depicted is depicted in accordance with an illustrative embodiment. As depicted, dashboard 300 illustrates one example implementation of reconciliation tab 224 of dashboard interface 216 in FIG. 2 for posting transactions.

The illustrations of graphical user interface in FIGS. 3-11 are provided as one illustrative example of an implementation for data reconciliation and task processing implemented in a dashboard interface and are not meant to limit the manner in which the dashboard interface can be generated and presented in other illustrative examples.

Figure 12:
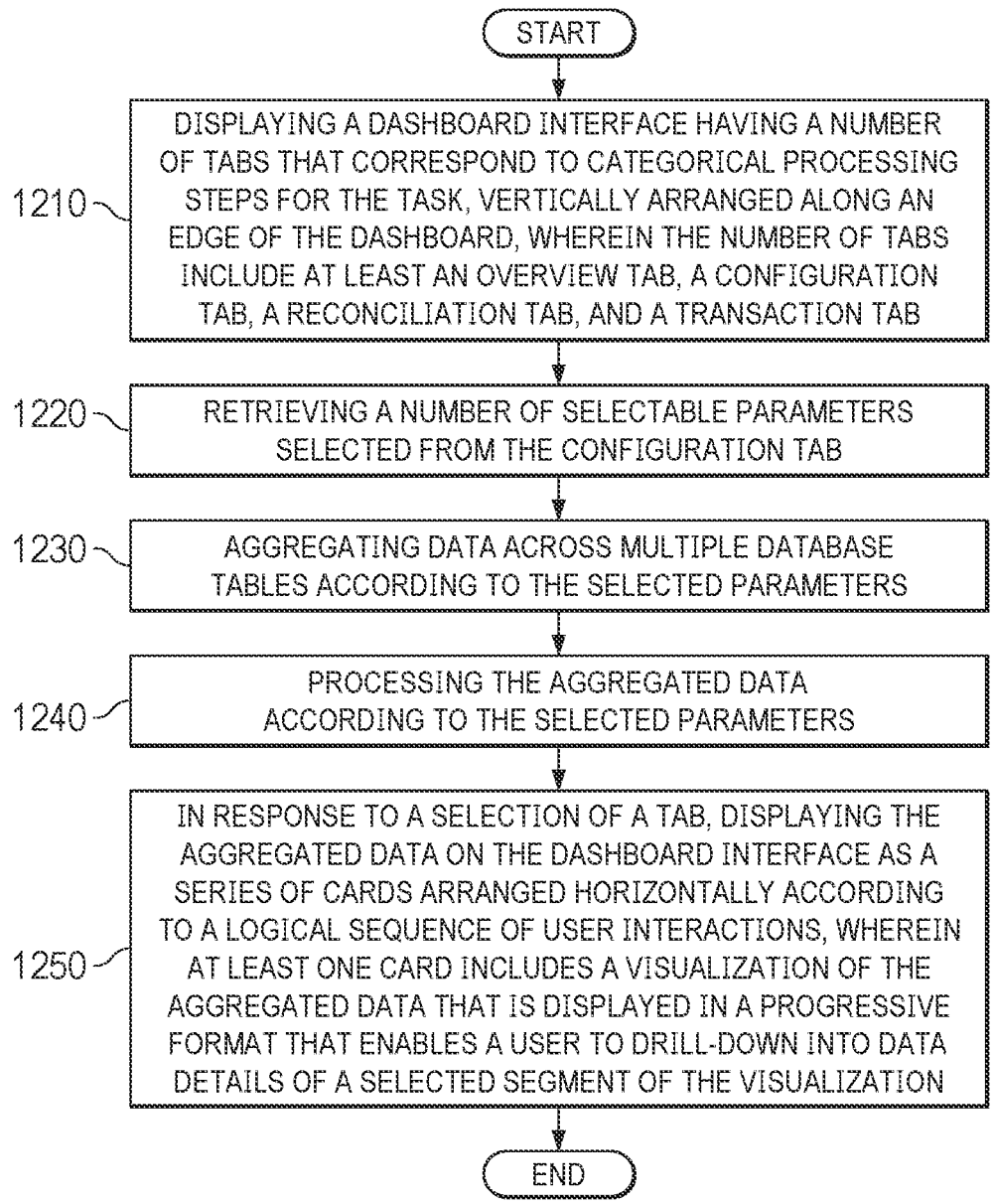
FIG. 12 is a flowchart of a process for data reconciliation and task processing implemented in a dashboard interface depicted in accordance with an illustrative embodiment.

Turning next to FIG. 12, a flowchart of a process for data reconciliation and task processing implemented in a dashboard interface is depicted in accordance with an illustrative embodiment. The process in FIG. 6 can be implemented in hardware, software, or both. When implemented in software, the process can take the form of program code that is run by one or more processor units located in one or more hardware devices in one or more computer systems. For example, the process can be implemented in report processing application 206 in computer system 204 in FIG. 2.

The process begins by displaying a dashboard interface having a number of tabs that correspond to categorical processing steps for the task (step 1210). The number of are vertically arranged along an edge of the dashboard. The number of tabs include at least an overview tab, a configuration tab, a reconciliation tab, and a transaction tab.

The process retrieves a number of selectable parameters selected from the configuration tab (step 1220), and aggregates data across multiple database tables according to the selected parameters (step 1230). The aggregated data is processed according to the selected parameters (step 1240).

In response to a selection of a tab, the process displays the aggregated data on the dashboard interface as a series of cards arranged horizontally according to a logical sequence of user interactions (step 1250). At least one card includes a visualization of the aggregated data that is displayed in a progressive format that enables a user to drill-down into data details of a selected segment of the visualization. Thereafter, the process terminates.

Figure 13:
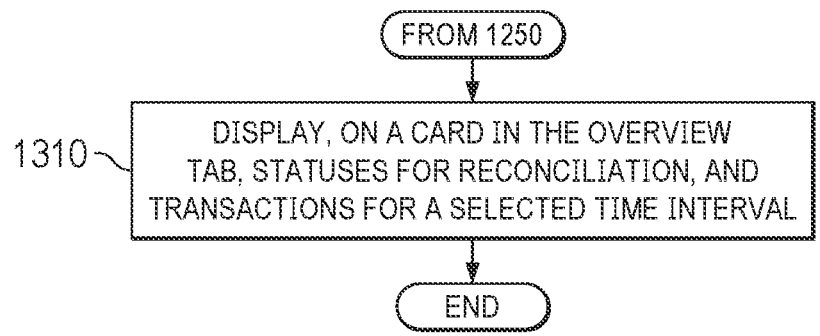
FIG. 13 is a flowchart of a process for displaying reconciliation status is depicted in accordance with an illustrative embodiment.

With reference next to FIG. 13, a flowchart of a process for displaying reconciliation status is depicted in accordance with an illustrative embodiment. The process in FIG. 13 can be implemented in conjunction with one or more steps for the process of FIG. 12.

Continuing from step 1250 of FIG. 12, the process displays, on a card in the overview tab, statuses for reconciliation, and transactions for a selected time interval (step 1310). The statuses are displayed at summary level of all relevant information according to the progressive format. The process terminates thereafter.

Figure 14:
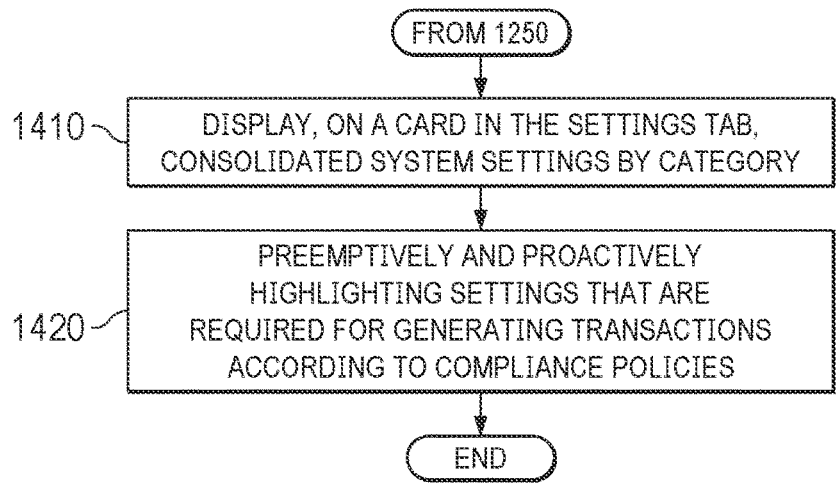
FIG. 14 is a flowchart of a process for displaying consolidated system settings depicted in accordance with an illustrative embodiment.

With reference next to FIG. 14, a flowchart of a process for displaying consolidated system settings is depicted in accordance with an illustrative embodiment. The process in FIG. 14 can be implemented in conjunction with one or more steps for the process of FIG. 12.

Continuing from step 1250 of FIG. 12, the process displays, on a card in the settings tab, consolidated system settings by category (step 1410). The process preemptively and proactively highlighting settings that are required for generating transactions according to of compliance policies (step 1420). In one illustrative example, the compliance policies are one or more policies related to quarterly filings of payroll taxes. The process terminates thereafter.

Figure 15:
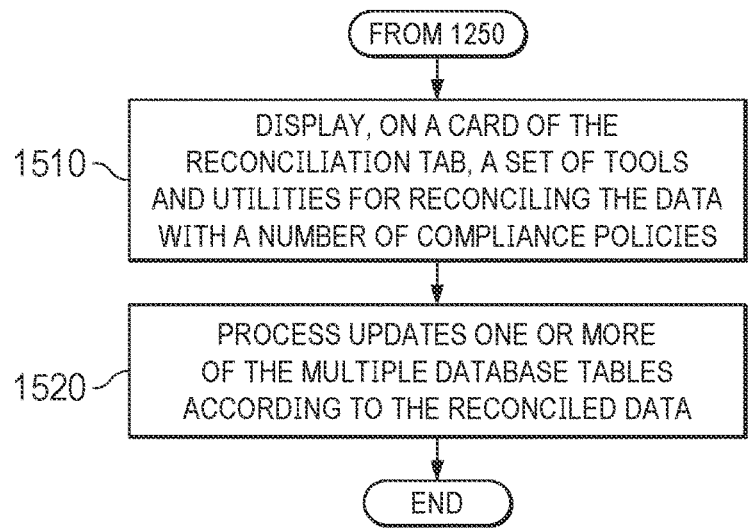
FIG. 15 is a flowchart of a process for reconciling data with a number of compliance policies depicted in accordance with an illustrative embodiment.

With reference next to FIG. 15, a flowchart of a process for reconciling data with a number of compliance policies is depicted in accordance with an illustrative embodiment. The process in FIG. 15 can be implemented in conjunction with one or more steps for the process of FIG. 12.

Continuing from step 1250 of FIG. 12, the process displays, on a card of the reconciliation tab, a set of tools and utilities for reconciling the data with a number of compliance policies (step 1510). Responsive to a selection of the tools and utilities, the process updates one or more of the multiple database tables according to the reconciled data (step 1520). Thereafter, the process terminates.

Figure 16:
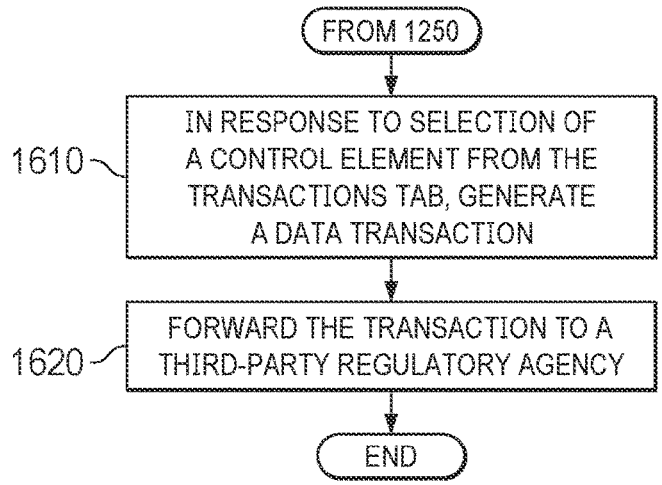
FIG. 16 is a flowchart of a process for generating a transaction depicted in accordance with an illustrative embodiment.

With reference next to FIG. 16, a flowchart of a process for generating a transaction is depicted in accordance with an illustrative embodiment. The process in FIG. 15 can be implemented in conjunction with one or more steps for the process of FIG. 12.

Continuing from step 1250 of FIG. 12, In response to selection of a control element from the transactions tab, the process generates a data transaction (step 1610) and forwards the transaction to a third-party regulatory agency (step 1620). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 17:
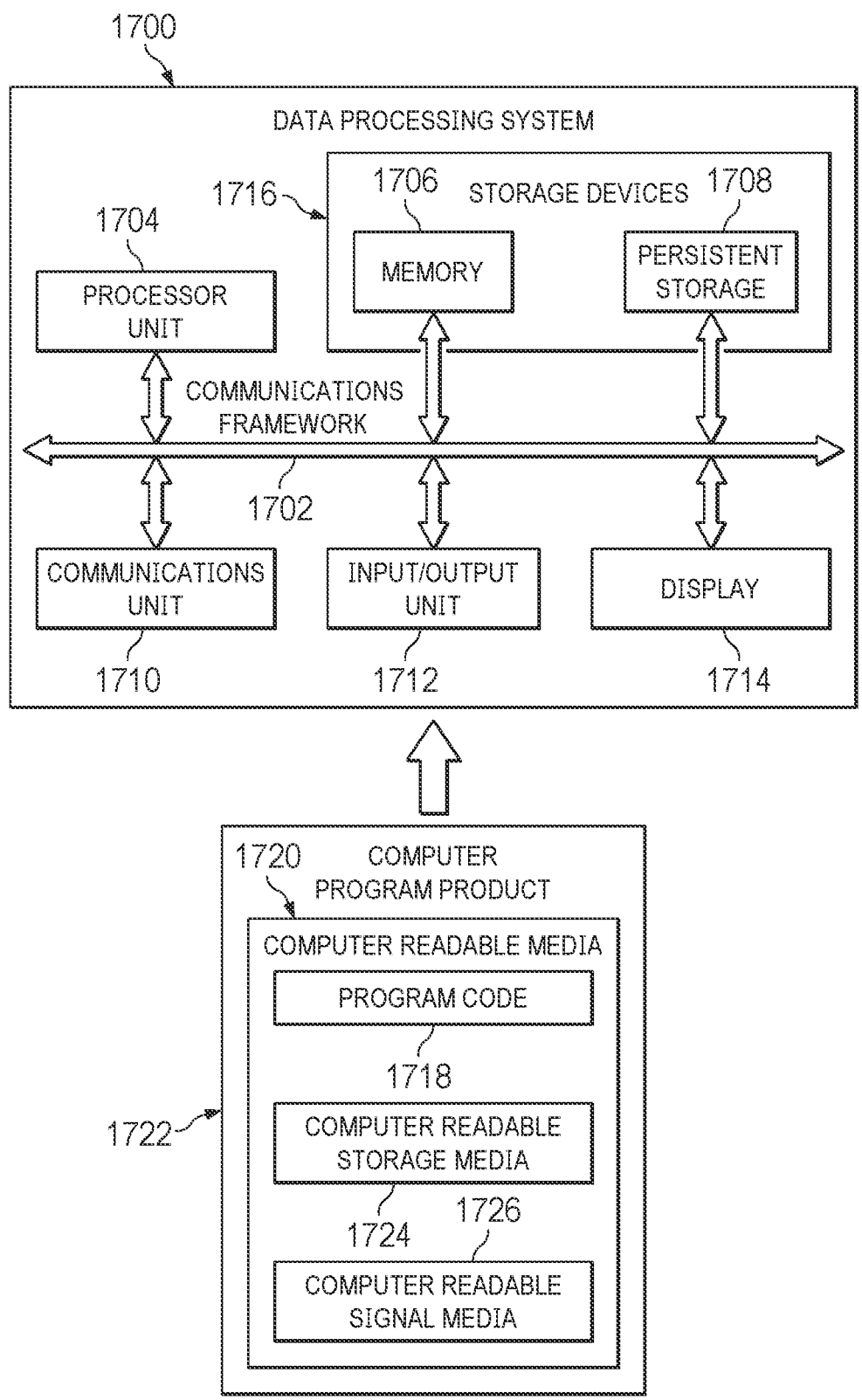
FIG. 17 is a block diagram of a data processing system in accordance with an illustrative embodiment.

Turning now to FIG. 17, a block diagram of a data processing system is depicted in accordance with an illustrative embodiment. Data processing system 1700 can be used to implement server computer 104, server computer 106, client devices 110, in FIG. 1. Data processing system 1700 can also be used to implement computer system 204 in FIG. 2. In this illustrative example, data processing system 1700 includes communications framework 1702, which provides communications between processor unit 1704, memory 1706, persistent storage 1708, communications unit 1710, input/output (I/O) unit 1712, and display 1714. In this example, communications framework 1702 takes the form of a bus system.

Processor unit 1704 serves to execute instructions for software that can be loaded into memory 1706. Processor unit 1704 includes one or more processors. For example, processor unit 1704 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1704 can may be implemented using one or more heterogeneous processor systems in which a main processor is present with secondary processors on a single chip. As another illustrative example, processor unit 1704 can be a symmetric multi-processor system containing multiple processors of the same type on a single chip.

Memory 1706 and persistent storage 1708 are examples of storage devices 1716. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1716 may also be referred to as computer-readable storage devices in these illustrative examples. Memory 1706, in these examples, can be, for example, a random-access memory or any other suitable volatile or non-volatile storage device. Persistent storage 1708 may take various forms, depending on the particular implementation.

For example, persistent storage 1708 may contain one or more components or devices. For example, persistent storage 1708 can be a hard drive, a solid-state drive (SSD), a flash memory, a rewritable optical disk, a rewritable magnetic tape, or some combination of the above. The media used by persistent storage 1708 also can be removable. For example, a removable hard drive can be used for persistent storage 1708.

Communications unit 1710, in these illustrative examples, provides for communications with other data processing systems or devices. In these illustrative examples, communications unit 1710 is a network interface card.

Input/output unit 1712 allows for input and output of data with other devices that can be connected to data processing system 1700. For example, input/output unit 1712 may provide a connection for user input through at least one of a keyboard, a mouse, or some other suitable input device. Further, input/output unit 1712 may send output to a printer. Display 1714 provides a mechanism to display information to a user.

Instructions for at least one of the operating system, applications, or programs can be located in storage devices 1716, which are in communication with processor unit 1704 through communications framework 1702. The processes of the different embodiments can be performed by processor unit 1704 using computer-implemented instructions, which may be located in a memory, such as memory 1706.

These instructions are program instructions and are also referred are referred to as program code, computer usable program code, or computer-readable program code that can be read and executed by a processor in processor unit 1704. The program code in the different embodiments can be embodied on different physical or computer-readable storage media, such as memory 1706 or persistent storage 1708.

Program code 1718 is located in a functional form on computer-readable media 1720 that is selectively removable and can be loaded onto or transferred to data processing system 1700 for execution by processor unit 1704. Program code 1718 and computer-readable media 1720 form computer program product 1722 in these illustrative examples.

In the illustrative example, computer-readable media 1720 is computer-readable storage media 1724.

In these illustrative examples, computer-readable storage media 1720 is a physical or tangible storage device used to store program code 1718 rather than a medium that propagates or transmits program code 1718. Computer-readable storage media 1724, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. The term "non-transitory" or "tangible," as used herein, is a limitation of the medium itself (i.e., tangible, not a signal) as opposed to a limitation on data storage persistency (e.g., RAM vs. ROM).

Alternatively, program code 1718 can be transferred to data processing system 1700 using a computer-readable signal media. The computer-readable signal media are signals and can be, for example, a propagated data signal containing program code 1718. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1720" can be singular or plural. For example, program code 1718 can be located in computer-readable media 1720 in the form of a single storage device or system. In another example, program code 1718 can be located in computer-readable media 1720 that is distributed in multiple data processing systems. In other words, some instructions in program code 1718 can be located in one data processing system while other instructions in program code 1718 can be located in one data processing system. For example, a portion of program code 1718 can be located in computer-readable media 1720 in a server computer while another portion of program code 1718 can be located in computer-readable media 1720 located in a set of client computers.

The different components illustrated for data processing system 1700 are not meant to provide architectural limitations to the manner in which different embodiments can be implemented. In some illustrative examples, one or more of the components may be incorporated in or otherwise form a portion of, another component. For example, memory 1706, or portions thereof, may be incorporated in processor unit 1704 in some illustrative examples. The different illustrative embodiments can be implemented in a data processing system including components in addition to or in place of those illustrated for data processing system 1700. Other components shown in FIG. 17 can be varied from the illustrative examples shown. The different embodiments can be implemented using any hardware device or system capable of running program code 1718.

Thus, the illustrative embodiments of the present invention provide a computer-implemented method, computer system, and computer program product for data reconciliation and task processing implemented in a dashboard interface. The dashboard interface has a number of tabs that correspond to categorical processing steps for the task, vertically arranged along an edge of the dashboard interface. The number of tabs include at least an overview tab, a configuration tab, a reconciliation tab, and a transaction tab. A report processing application retrieves a number of selectable parameters selected from the configuration tab of the dashboard interface, and aggregates data across multiple database tables, and processes the aggregated data according to the selected parameters. In response to a selection of a tab from dashboard interface, the aggregated data is displayed on the dashboard interface as a series of cards arranged horizontally according to a logical sequence of user interactions. At least one card includes a visualization of the aggregated data that is displayed in a progressive format that enables a user to drill-down into data details of a selected segment of the visualization.

In one or more illustrative embodiments, the dashboard interface described herein solves problems of prior graphical user interface devices (GUIs), in the context of computerized report processing, relating to speed, accuracy, and usability. Rather than reciting a mathematical algorithm, a fundamental economic or longstanding commercial practice, or a challenge in business, the illustrative examples improve on existing graphical user interface devices that do not have a pre-electronic analog. specifically, the dashboard interface of the illustrative examples provides significantly more than prior graphical user interface devices that merely allow for setting, displaying, and selecting data or information that is visible on a graphical user interface device. The dashboard interface of the illustrative examples utilizes a specific, structured interface directly related a prescribed functionality that resolves a specifically identified problem of accessing aggregated real-time processing data when processing reports. The dashboard interface of the illustrative examples provides an inventive concept that enables report processing that is easier to understand and follow without significant knowledge of the software, utilities, and configurations, eliminating the need to spend extensive effort exporting reports and/or data extracts to manually aggregate the same data, resulting in less effort and improved client efficiencies.

The descriptions of the various embodiments of the present invention have been presented for purposes of illustration but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A method for data reconciliation and task processing implemented in a dashboard interface, the method comprising:

displaying, by a computer system, a first view of the dashboard interface, the first view having a number of tabs that correspond to categorical processing steps for a task, the number of tabs vertically arranged along an edge of the dashboard interface, wherein the number of tabs include at least an overview tab to provide information corresponding to tax filings, a configuration tab to receive one or more selections, a reconciliation tab to display information provided to the dashboard interface, and a transaction tab to process one or more transactions;

receiving, by the computer system via the dashboard interface, a first selection from the configuration tab;

retrieving, by the computer system, responsive to receiving the first selection, information associated with the first selection from the configuration tab;

aggregating, by the computer system, based on the first selection, payroll data across multiple database tables to reduce subsequent retrievals of repetitive data;

processing, by the computer system, responsive to aggregating the payroll data, the payroll data according to the first selection;

receiving, by the computer system via the dashboard interface, a second selection of at least one tab of the number of tabs;

identifying, by the computer system, a sequence of interactions with the dashboard interface, the sequence of interactions including one or more second selections via the dashboard interface;

ordering, by the computer system, a second view of the dashboard interface according to the sequence of interactions;

outputting, by the computer system, responsive to receiving the one or more second selections, the dashboard interface having the second view, the second view including:
  at least one of the overview tab, the configuration tab, the reconciliation tab, or the transaction tab;
  a series of cards arranged horizontally on the dashboard interface;
  at least one card of the series of cards including a visualization of at least a portion of the payroll data; and
  the visualization of the at least the portion of the payroll data updateable based on one or more third selections of segments included in the visualization;

receiving, by the computer system, responsive to outputting the dashboard interface having the second view, a selection of a control element of the transaction tab;

generating, by the computer system, based on the selection of the control element, a data transaction in accordance with one or more rules associated with a third-party regulatory agency; and forwarding, by the computer system, responsive to generating the data transaction, the data transaction to the third-party regulatory agency for recordation of the data transaction with the third-party regulatory agency.

2. The method of claim 1, further comprising:
displaying, by the computer system, on a card of the series of cards, statuses for reconciliation, and transactions for a selected time interval, wherein the statuses are displayed at summary level of all relevant information according to a progressive format.

3. The method of claim 1, further comprising:
displaying, by the computer system, on a card of the series of cards, consolidated system settings by category; and
preemptively and proactively highlighting, by the computer system, settings for generating transactions according to a number of compliance policies.

4. The method of claim 1, further comprising:
displaying, by the computer system, on a card of the series of cards, a set of tools and utilities for reconciling the payroll data with a number of compliance policies; and
responsive to a selection of the set of tools and utilities, updating, by the computer system, one or more of the multiple database tables according to reconciled data.

5. The method of claim 4, wherein the number of compliance policies or one or more policies are policies for quarterly filings of payroll taxes.

6. The method of claim 1, wherein the series of cards are arranged horizontally on the dashboard interface according to a logical sequence of user interactions.

7. A computer system comprising:
a storage device configured to store program code;
a display system; and
one or more processors operably connected to the storage device and the display system, wherein the program code causes, when executed by the one or more processors, the one or more processors to:
  display a first view of a dashboard interface, the first view having a number of tabs that correspond to categorical processing steps for a task, the number of tabs vertically arranged along an edge of the dashboard interface, wherein the number of tabs include at least an overview tab to provide information corresponding to tax filings, a configuration tab to receive one or more selections, a reconciliation tab to display information provided to the dashboard interface, and a transaction tab to process one or more transactions;
  receive, via the dashboard interface, a first selection from the configuration tab;
  retrieve, responsive to receipt of the first selection, information associated with the first selection;
  aggregate, based on the first selection, payroll data across multiple database tables to reduce subsequent retrievals of repetitive data;
  process, responsive to aggregation of the payroll data, the payroll data according to the first selection;
  receive, via the dashboard interface, a second selection of at least one tab of the number of tabs;
  identify a sequence of interactions with the dashboard interface, the sequence of interactions including one or more second selections via the dashboard interface;
  order a second view of the dashboard interface according to the sequence of interactions;
  output, responsive to receiving the one or more second selections, the dashboard interface having the second view, the second view including:
    at least one of the overview tab, the configuration tab, the reconciliation tab, or the transaction tab;
    a series of cards arranged horizontally on the dashboard interface;
    at least one card of the series of cards including a visualization of at least a portion of the payroll data; and
    the visualization of the at least the portion of the payroll data updateable based on one or more third selections of segments included in the visualization;
  receive, responsive to the output of the dashboard interface having the second view, a selection of a control element of the transaction tab;
  generate, based on the selection of the control element, a data transaction in accordance with one or more rules associated with a third-party regulatory agency; and
  forward, responsive to generating the data transaction, the data transaction to the third-party regulatory agency for recordation of the data transaction with the third-party regulatory agency.

8. The computer system of claim 7, wherein the program code further causes the one or more processors to:
display, on a card of the series of cards, statuses for reconciliation, and transactions for a selected time interval, wherein the statuses are displayed at summary level of all relevant information according to a progressive format.

9. The computer system of claim 7, wherein the program code further causes the one or more processors to:
display, on a card of the series of cards, consolidated system settings by category; and
preemptively and proactively highlight settings for generating transactions according to a number of compliance policies.

10. The computer system of claim 7, wherein the program code further causes the one or more processors to:
display, on a card of the series of cards, a set of tools and utilities for reconciling the payroll data with a number of compliance policies; and
responsive to a selection of the set of tools and utilities, update one or more of the multiple database tables according to reconciled data.

11. The computer system of claim 10, wherein the number of compliance policies or one or more policies are policies for quarterly filings of payroll taxes.

12. The computer system of claim 7, wherein the series of cards are arranged horizontally on the dashboard interface according to a logical sequence of user interactions.

13. A computer program product comprising:
a computer readable storage media; and
program code, stored on the computer readable storage media, for data reconciliation and task processing implemented in a dashboard interface, and when executed, cause a computer system to:
display a first view of the dashboard interface, the first view having a number of tabs that correspond to categorical processing steps for a task, the number of tabs vertically arranged along an edge of the dashboard interface, wherein the number of tabs include at least an overview tab to provide information corresponding to tax filings, a configuration tab to receive one or more selections, a reconciliation tab to display information provided to the dashboard interface, and a transaction tab to process one or more transactions;
receive, via the dashboard interface, a first selection from the configuration tab;
retrieve, responsive to receipt of the first selection, information associated with the first selection;
aggregate, based on the first selection, payroll data across multiple database tables to reduce subsequent retrievals of repetitive data;
process, responsive to aggregation of the payroll data, the payroll data according to the first selection;
receive, via the dashboard interface, a second selection of at least one tab of the number of tabs;
identify a sequence of interactions with the dashboard interface, the sequence of interactions including one or more second selections via the dashboard interface;
order a second view of the dashboard interface according to the sequence of interactions;
output, responsive to receiving the one or more second selections, the dashboard interface having the second view, the second view including:
at least one of the overview tab, the configuration tab, the reconciliation tab, or the transaction tab;
a series of cards arranged horizontally on the dashboard interface;
at least one card of the series of cards including a visualization of at least a portion of the payroll data; and
the visualization of the at least the portion of the payroll data updateable based on one or more third selections of segments included in the visualization;
receive, responsive to the output of the dashboard interface having the second view, a selection of a control element of the transaction tab;
generate, based on the selection of the control element, a data transaction in accordance with one or more rules associated with a third-party regulatory agency; and
forward, responsive to generating the data transaction, the data transaction to the third-party regulatory agency for recordation of the data transaction with the third-party regulatory agency.

14. The computer program product of claim 13, wherein the program code further causes the computer system to:
display, on a card of the series of cards, statuses for reconciliation, and transactions for a selected time interval, wherein the statuses are displayed at summary level of all relevant information according to a progressive format.

15. The computer program product of claim 13, wherein the program code further causes the computer system to:
display, on a card of the series of cards, consolidated system settings by category; and
preemptively and proactively highlight settings that are required for generating transactions according to a number of compliance policies.

16. The computer program product of claim 13, wherein the program code further causes the computer system to:
display, on a card of the series of cards, a set of tools and utilities for reconciling the payroll data with a number of compliance policies; and
responsive to a selection of the set of tools and utilities, update one or more of the multiple database tables according to reconciled data.

17. The computer program product of claim 16, wherein the number of compliance policies or one or more policies are policies for quarterly filings of payroll taxes.

18. The computer program product of claim 13, wherein the series of cards are arranged horizontally on the dashboard interface according to a logical sequence of user interactions.

* * * * *